United States Patent
Engelhardt et al.

(10) Patent No.: US 6,977,773 B2
(45) Date of Patent: Dec. 20, 2005

(54) SCANNING MICROSCOPE AND COUPLING-OUT ELEMENT

(75) Inventors: Johann Engelhardt, Bad Schoenborn (DE); Werner Knebel, Kronau (DE); Heinrich Ulrich, Heidelberg (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 10/766,260

(22) Filed: Jan. 27, 2004

(65) Prior Publication Data

US 2004/0190133 A1   Sep. 30, 2004

Related U.S. Application Data

(62) Division of application No. 10/128,858, filed on Apr. 23, 2002, now abandoned.

(30) Foreign Application Priority Data

Apr. 26, 2001  (DE) ................................ 101 20 424

(51) Int. Cl.$^7$ ............................................. G02B 21/00
(52) U.S. Cl. ...................... 359/381; 359/388; 359/389
(58) Field of Search ................................ 359/233, 234, 359/368, 372, 381, 385, 386, 388, 389, 390, 359/821; 385/33

(56) References Cited

U.S. PATENT DOCUMENTS

| | | | |
|---|---|---|---|
| 5,081,350 A * | 1/1992 | Iwasaki et al. ............ 250/234 |
| 5,112,125 A | 5/1992 | Neumann .................... 356/73 |
| 5,169,289 A | 12/1992 | Lalanne ................... 250/458.1 |
| 5,537,247 A * | 7/1996 | Xiao .......................... 359/368 |
| 6,167,173 A * | 12/2000 | Schoeppe et al. ............. 385/33 |
| 6,276,804 B1 | 8/2001 | Tandler et al. .............. 359/614 |
| 6,337,767 B1 * | 1/2002 | Takeuchi .................... 359/388 |
| 6,429,968 B1 * | 8/2002 | Carver ....................... 359/385 |
| 6,437,913 B1 * | 8/2002 | Kishi ......................... 359/389 |
| 6,667,805 B2 * | 12/2003 | Norton et al. .............. 356/326 |

FOREIGN PATENT DOCUMENTS

| | | |
|---|---|---|
| DE | 38 43 876 | 7/1990 |
| DE | 43 23 129 | 2/1994 |
| DE | 199 26 037 | 11/2000 |
| WO | WO 0109592 | 2/2001 |

\* cited by examiner

Primary Examiner—Mark A. Robinson
(74) Attorney, Agent, or Firm—Davidson, Davidson & Kappel, LLC (57) ABSTRACT

A scanning microscope has a light source that emits illuminating light for illumination of a specimen, at least one first detector for detection of the detected light proceeding from the specimen, an objective arranged in both an illumination beam path and a detection beam path, and a coupling-out element that is selectably for descan detection and non-descan detection positionable in the illumination and detection beam path. A light-guiding fiber is provided for transporting at least a portion of the detection light from the coupling-out element to the first detector.

16 Claims, 8 Drawing Sheets

PRIOR ART

Fig. 1

PRIOR ART

SCANNING MICROSCOPE AND COUPLING-OUT ELEMENT

This application is a division of prior application Ser. No. 10/128,858, filed Apr. 23, 2002, now abandoned, which claims priority to German patent application no. 101 20 424.8-42. Both of these applications are hereby incorporated by reference herein.

FIELD OF THE INVENTION

The invention concerns a scanning microscope having a light source that emits illuminating light for illumination of a specimen, having at least one first detector for detection of the detected light proceeding from the specimen, and having an objective by means of which the specimen can be illuminated and detected, the objective being arranged in both an illumination beam path and a detection beam path.

The invention further concerns a coupling-out element for a scanning microscope.

BACKGROUND OF THE INVENTION

In scanning microscopy, a specimen is illuminated with a light beam in order to observe the detected light (in the form of reflected or fluorescent light) emitted by the specimen. The focus of an illuminating light beam is moved in a specimen plane by means of a controllable beam deflection device, generally by tilting two mirrors; the deflection axes are usually perpendicular to one another, so that one mirror deflects in the X and the other in the Y direction. Tilting of the mirrors is brought about, for example, by means of galvanometer positioning elements. The power level of the detected light coming from the specimen is measured as a function of the position of the scanning beam. The positioning elements are usually equipped with sensors to ascertain the current mirror position.

In confocal scanning microscopy specifically, a specimen is scanned in three dimensions with the focus of a light beam.

A confocal scanning microscope generally comprises a light source, a focusing optical system with which the light of the source is focused onto a pinhole (called the "excitation pinhole"), a beam splitter, a beam deflection device for beam control, a microscope optical system, a detection pinhole, and the detectors for detection of the detected or fluorescent light. The illuminating light is coupled in via a beam splitter. The fluorescent or reflected light coming from the specimen travels via the beam deflection device back to the beam splitter, passes through the latter and is then focused onto the detection pinhole, behind which the detectors are located. This detection arrangement is called a "descan" arrangement. Detected light that does not originate directly from the focus region takes a different light path and does not pass through the detection pinhole, so that a point datum is obtained which, by sequential scanning of the specimen with the focus of the illuminating light beam, results in a three-dimensional image. A three-dimensional image is usually achieved by acquiring image data in layers. Commercial scanning microscopes usually comprise a scan module that is flange-mounted onto the stand of a conventional light microscope and contains all the aforesaid elements additionally necessary for scanning a specimen.

Commercial scanning microscopes usually contain a microscope stand like the one also used in conventional light microscopy. As a rule, confocal scanning microscopes in particular are also usable as conventional light microscopes.

In conventional fluorescent incident-light microscopy, the portion of the light of a light source (for example of an arc lamp) that comprises the desired wavelength region for fluorescent excitation is coupled into the microscope beam path with the aid of a color filter called the excitation filter. Coupling into the beam path of the microscope is accomplished using a dichroic beam splitter, which reflects the excitation light to the specimen while allowing the fluorescent light proceeding from the specimen to pass largely unimpeded. The excitation light scattered back from the specimen is held back with a blocking filter that is, however, transparent to the fluorescent radiation. Combining mutually matched filters and beam splitters optimally to yield an easily interchangeable modular filter block has been common for some time. The filter blocks are usually arranged in a turret within the microscope as a part of so-called fluorescent incident-light illuminators, thus enabling rapid and easy interchanging.

In confocal scanning microscopy, a detection pinhole can be dispensed in the case of two-photon (or multi-photon) excitation, since the excitation probability depends on the square of the photon density and thus on the square of the illuminating light intensity, which of course is much greater at the focus than in the adjacent regions. The fluorescent light being detected therefore very probably originates almost exclusively from the focus region, which renders superfluous any further differentiation, using a pinhole arrangement, between fluorescent photons from the focus region and fluorescent photons from the adjacent regions.

Especially given that the yield of fluorescent photons in two-photon excitation is in any case low, a non-descan arrangement, in which the detected light does not arrive at the detector via the beam deflection device (descan arrangement) and the beam splitter for coupling in the illuminating light, but rather is deflected directly after the objective by means of a dichroic beam splitter and detected, is of interest because less light is generally lost when the detected light is guided in this fashion. In addition, when descan detection is used in two-photon excitation, scattered components of the detected light contribute significantly to the signal, whereas with non-descan detection they play only a greatly reduced role. Arrangements of this kind are known, for example, from the publication by David W. Piston et al., "Two-photon excitation fluorescence imaging of three-dimensional calcium ion activity," Applied Optics, Vol. 33, No. 4, February 1996, and from Piston et al., "Time-Resolved Fluorescence Imaging and Background Rejection by Two-Photon Excitation in Laser Scanning Microscopy," SPIE Vol. 1640.

One problem with the known arrangements is that of arranging a beam splitter, to deflect the detected light out of the microscope beam path after the objective, within a scanning microscope for non-descan deflection, and aligning it precisely. This requires the implementation of complex additional arrangements that necessitate massive physical modifications to the scanning microscope and in particular to the microscope stand. Retrofitting to a scanning microscope with descan detection is usually impossible or very complex.

SUMMARY OF THE INVENTION

It is therefore an object of the present invention to provide a scanning microscope which is operable selectably with descan detection or with non-descan detection and with which it is possible to switch over easily and reliably between descan detection and non-descan detection.

The present invention provides a scanning microscope comprising:
- a light source for emitting illuminating light for illumination of a specimen,
- at least one first detector for descan detection of the detection light proceeding from the specimen,
- an objective arranged in both an illumination beam path and a detection beam path,
- a coupling-out element insertable into the illumination and detection beam path for non-descan detection, and removable from the illumination and detection beam path for descan detection, and
- a light-guiding fiber for transporting at least a portion of the detection light from the coupling-out element to the first detector.

A further object of the invention is to disclose a coupling-out element which easily enables a scanning microscope to be operated selectably with descan detection or with non-descan detection.

The present invention also provides a coupling-out element for a scanning microscope, the scanning microscope including a light source for emitting illuminating light for illumination of a specimen and at least one first detector for descan detection of detection light proceeding from the specimen. The coupling element is insertable into an illumination and detection beam path of the scanning microscope for non-descan detection, and is removable from the illumination and detection beam path for descan detection. The coupling-out element includes a light-guiding fiber for transporting at least a portion of detection light to the at least one first detector.

The invention has the advantage of making it possible to switch over easily between descan detection and non-descan detection.

In a preferred embodiment, the coupling-out element contains a beam splitter that is preferably configured as a dichroic beam splitter or color beam splitter. The beam splitter is preferably configured to be transparent to the illuminating light and reflective to the detected light.

In a further preferred embodiment, the coupling-out element comprises filters that act as excitation filters on the light in the illumination beam path or as detection filters on the light in the detection beam path. In a very particularly preferred embodiment, the coupling-out element contains both an excitation filter and a detection filter. The detection filter is preferably configured in such a way that it allows only the detected light proceeding from the specimen, and in particular no light of the wavelength of the illuminating light, to pass, thus advantageously preventing any undesirable and falsifying detection of that light in particular. The excitation filter serves to filter out from the spectrum of the light source those light components having the wavelengths of interest for illumination.

In another embodiment, the coupling-out element can be introduced from outside into the illumination and detection beam path in order to switch over from descan detection to non-descan detection, guidance elements such as guide rails, slide bars, or a bayonet mount, which make possible simple and reliable introduction and positioning, being provided. Also provided are banking elements, which define a working position of the coupling-out element in the illumination and detection beam path and which are configured so that the positioned coupling-out element is automatically aligned with respect to the detection beam path, and no further alignment of the coupling-out element is necessary after positioning.

In another preferred embodiment, a turret or a sliding carriage which comprises at least one element receptacle is provided for positioning the coupling-out element, the coupling-out element being mounted on or in the element receptacle in such a way that the coupling-out element can be positioned in the illumination and detection beam path by simply rotating the turret or sliding the sliding carriage. Alignment of the coupling-out element is performed only once, when the coupling-out element is mounted in or on the turret or sliding carriage. The latter advantageously has a snap-in apparatus that releasably immobilizes the turret or sliding carriage when the coupling-out element is positioned in the illumination and detection beam path. In a further variant embodiment, the turret or sliding carriage comprises several element receptacles in which other optical elements, for example filters or additional optical systems, are mounted. The turret or sliding carriage also comprises at least one open position that can be introduced into the illumination and detection beam path in such a way that the illuminating light and detected light can pass unimpeded. This manner of achieving the object of the invention is economical and highly flexible, since several coupling-out elements having different beam splitters with different spectral properties can be held in readiness and easily interchanged.

In a preferred embodiment, the coupling-out element is a component of a fluorescent incident-light illuminator. This embodiment is very particularly advantageous in scanning microscopes that are also suitable for conventional incident-light microscopy, which contain a fluorescent incident-light illuminator with a turret. This has the advantage of utilizing or putting to a different purpose apparatuses which usually are present in any case, thereby avoiding any physical modification to the microscope or the microscope stand. By simply rotating the turret of the fluorescent incident-light illuminator, it is possible to switch between conventional fluorescence microscopy, descan detection, and non-descan detection.

The coupling-out element delivers at least a portion of the detected light to a further detector. In an embodiment, this detector is mounted externally on the scanning microscope, the scanning microscope having an opening in the housing through which, in the context of non-descan detection, the detected light emerges and arrives at the further detector. In another embodiment, the further detector is a component of the coupling-out element. Semiconductor detectors, such as photodiodes or avalanche photodiodes, are particularly advantageous in this context because of their small overall size. Photomultipliers are also usable. In a particularly preferred embodiment, the further detector contains at least two further individual detectors for separate detection of different spectral regions of the detected light. Beam splitters, which advantageously are housed in a filter block, are provided in order to divide the detected light. Further filters and/or optical systems can be inserted into the filter block. It is very particularly advantageous, especially in terms of integrated manufacture, if the filter block has the same dimensions and guidance and/or banking elements as the coupling-out element.

In an embodiment, in non-descan detection mode the detected light coupled out by means of the coupling-out element is delivered to the detector actually provided for descan detection. Mirror arrangements or light-guiding fibers are provided for this purpose. This variant embodiment has the particular advantage that a single detector alone can be used for both descan detection and non-descan detection, which makes the entire scanning microscope much simpler and less expensive to manufacture.

BRIEF DESCRIPTION OF THE DRAWINGS

The subject matter of the invention is schematically depicted in the drawings and will be described below with reference to the Figures, identically functioning elements being labeled with the same reference characters. In the drawings.

DETAILED DESCRIPTION OF THE INVENTION

Figure 1:
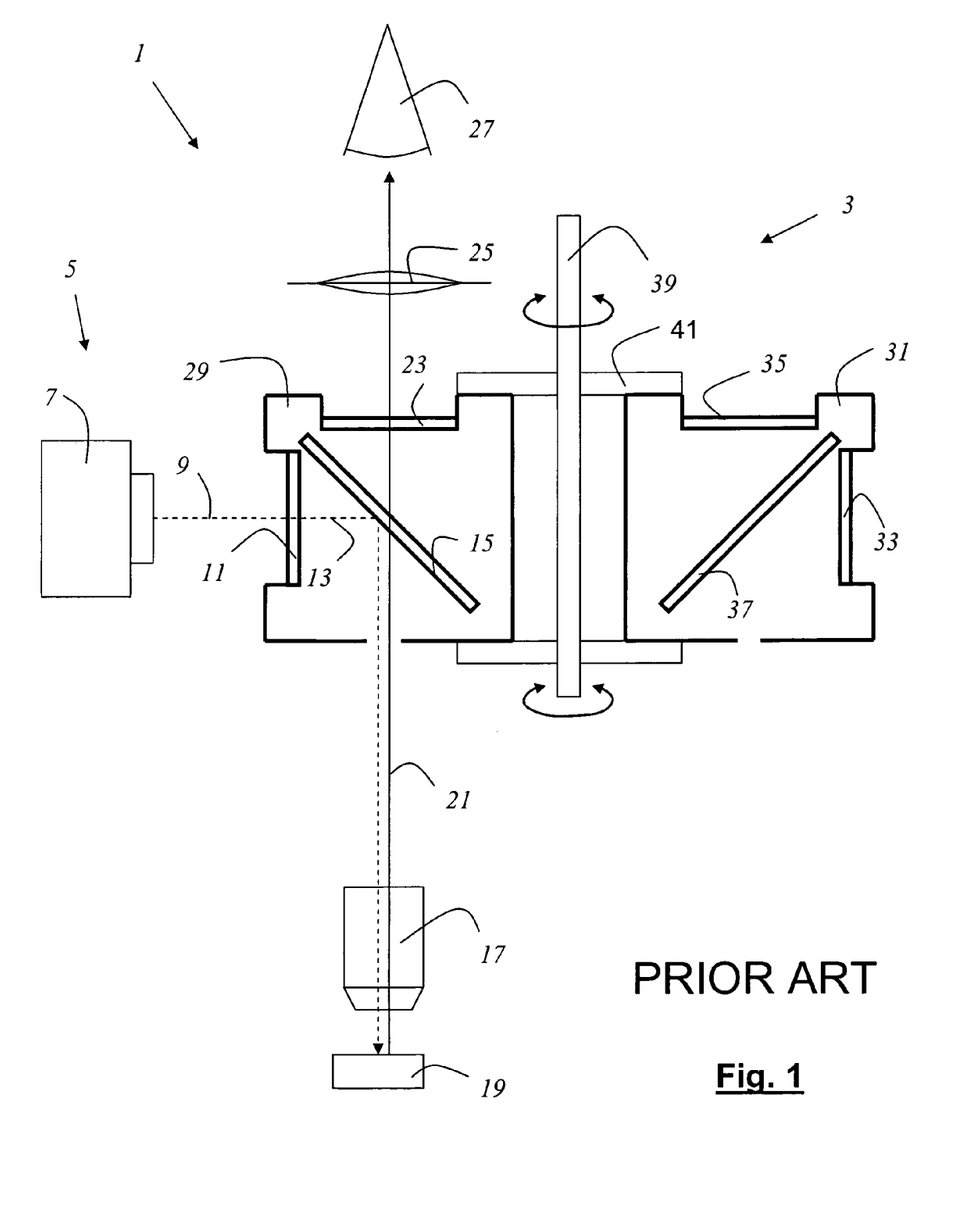
FIG. 1 shows a prior art arrangement for fluorescence microscopy, having several interchangeable modular filter blocks in a turret.

FIG. 1 schematically shows an incident-light fluorescence microscope 1 known from the existing art, having a fluorescent incident-light illuminator 3. Excitation filter 11 is used to filter out from light 9 coming from light source 5, which is embodied as an arc lamp 7, those components having the desired wavelengths (i.e. excitation light 13). Excitation light 13 is then reflected from dichroic beam splitter 15 toward microscope objective 17, which focuses excitation light 13 onto specimen 19. Fluorescent light 21 proceeding from the specimen travels back through the microscope objective to dichroic beam splitter 15, passes through it, and is incident through blocking filter 23 and eyepiece 25 into the user's eye 27. Excitation filter 11, blocking filter 23, and dichroic beam splitter 15 are arranged in an interchangeable modular first filter block 29.

First filter block 29 is arranged, together with a further filter block 31 that contains an excitation filter 33, a detection filter 35, and a beam splitter 37, in a turret 41 that can rotate about shaft 39. Excitation filter 33, detection filter 35, and beam splitter 37 have different spectral properties from excitation filter 11, detection filter 23, and beam splitter 15 of first filter block 29. Filter block 29, 31 having the desired optical properties can be brought into the microscope's beam path by rotating the turret.

Figure 2:
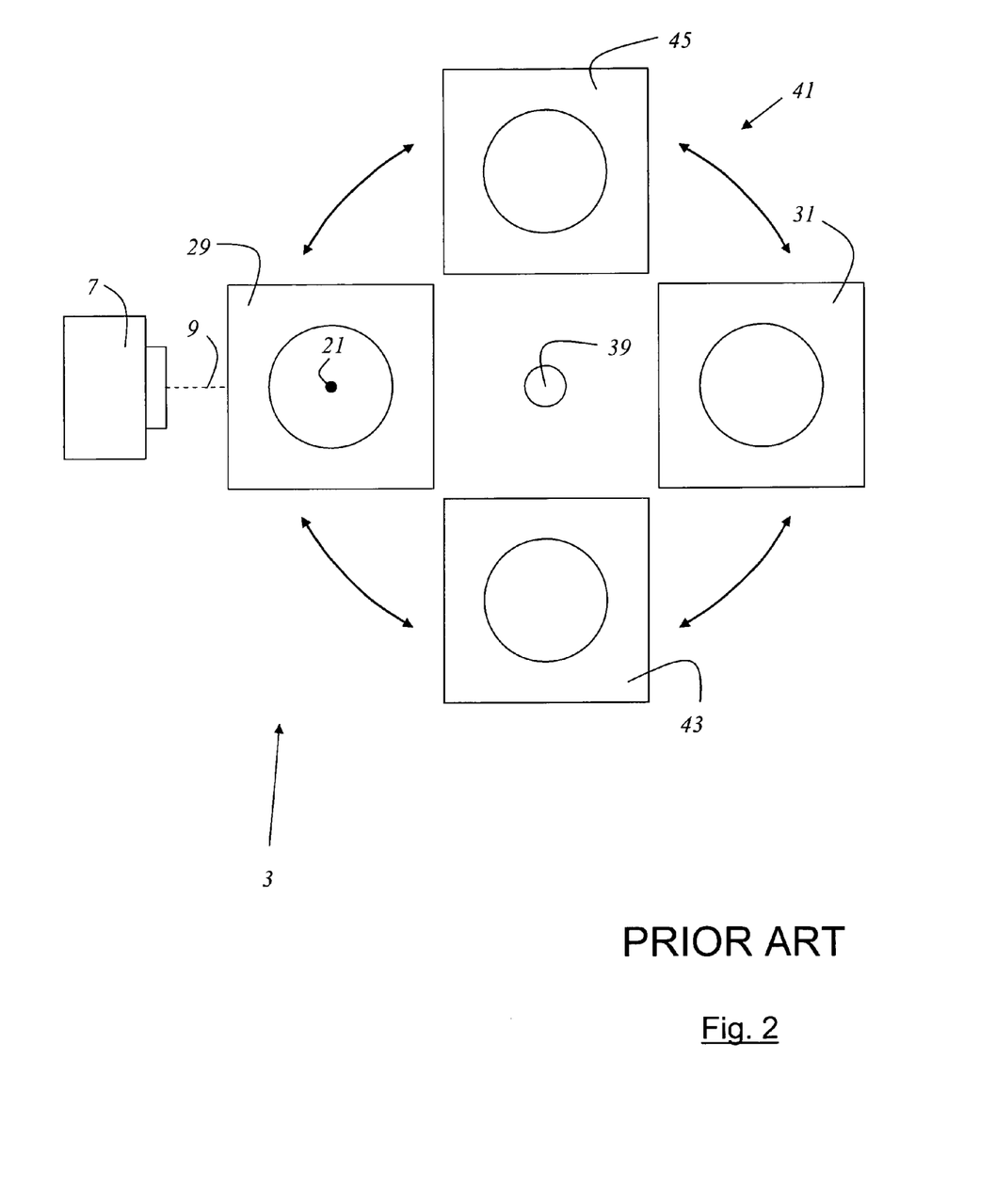
FIG. 2 is a plan view of the arrangement from FIG. 1.

FIG. 2 shows known incident-light fluorescence microscope 1 in a plan view, in which it is evident that the turret contains not only filter blocks 29 and 31 but also two further filter blocks 43, 45.

Figure 3:
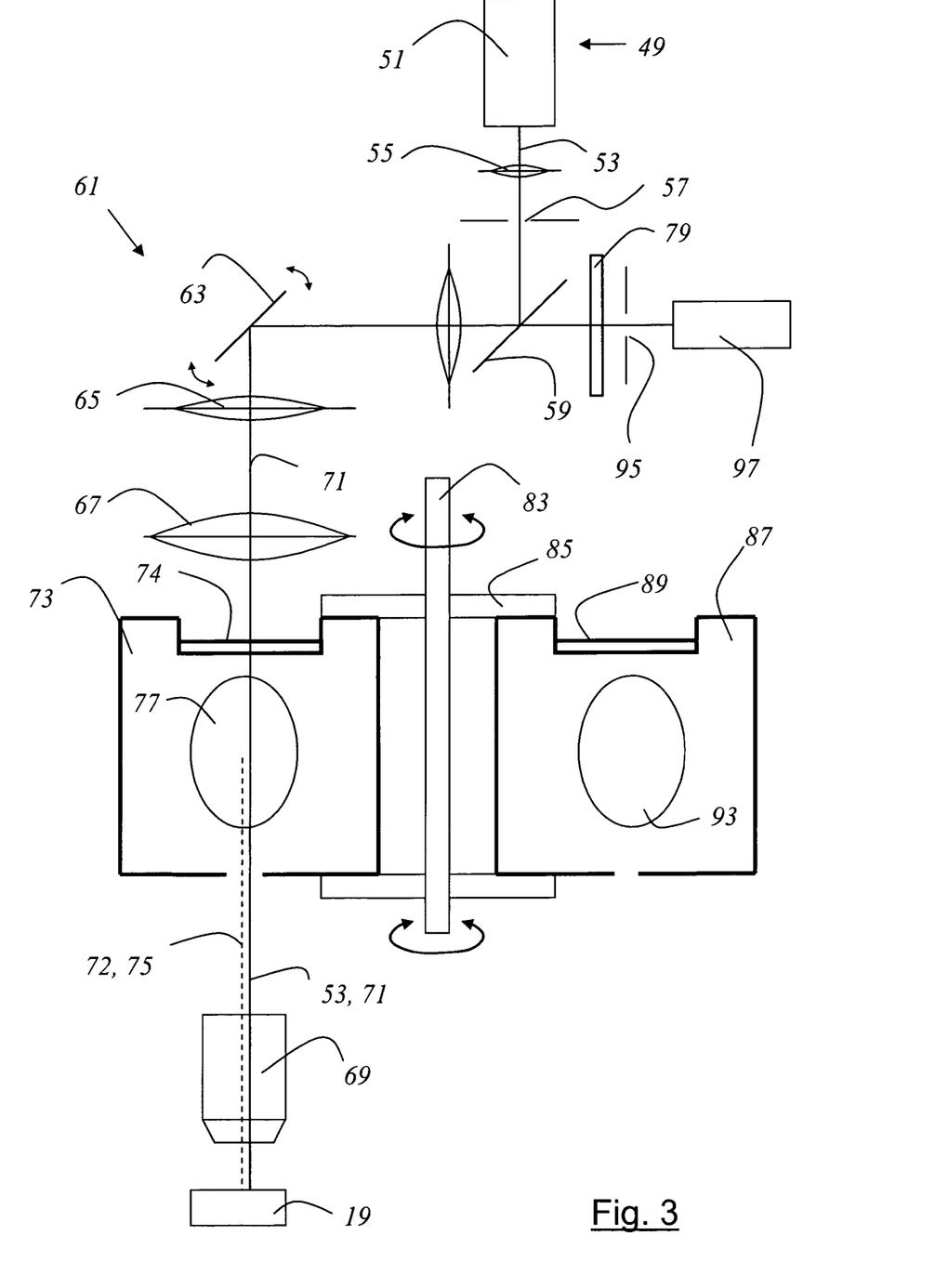
FIG. 3 shows a scanning microscope according to the present invention.

FIG. 3 shows a scanning microscope 47 according to the present invention. Illuminating light 53 coming from a light source 49, which is embodied as a mode-locked titanium-sapphire laser 51, has a wavelength of approx. 800 nm and is focused by optical system 55 onto excitation pinhole 57, and is then reflected by a beam splitter 59 to beam deflection device 61 which contains a gimbal-mounted mirror 63. Scanning optical system 65, tube optical system 67, and objective 69 define an illumination beam path 71 and a detection beam path 72, along which illuminating light 53, shaped into a beam, is guided over or through specimen 19.

Located between tube optical system 67 and objective 69 is coupling-out element 73, containing a dichroic beam splitter 77 and an excitation filter 74, for coupling out detected light 75 proceeding from the sample. Dichroic beam splitter 77 is configured so that illuminating light 53 having a wavelength of approx. 800 nm can pass unimpeded, and detected light 75 is reflected (out of the plane of the drawing) toward further detectors 80, 81 (not shown in this Figure). Coupling-out element 73 is arranged in a turret 85 that can rotate about shaft 83, and is aligned in such a way that by rotation of turret 85, it can be positioned in the excitation and detection beam path. Arranged in turret 85 is a further coupling-out element 87 that contains an excitation filter 89, a detection filter 91, and a beam splitter 93, these elements having spectral properties different from those of first coupling-out element 73. The coupling-out element 73, 87 that has the particular desired optical properties can be positioned in illumination and detection beam path 71, 72 by rotation of turret 85. For descan detection, turret 85 can additionally be rotated into an open position 99, 101 (not depicted in this Figure) so that both illuminating light 53 and detected light 75 pass unimpeded. In descan detection mode, detected light 75 travels via beam deflection device 61 back to beam splitter 59, passes through the latter, through blocking filter 79 which suppresses residual radiation from the excitation light, and through detection pinhole 95, and then strikes first detector 97.

Figure 4:
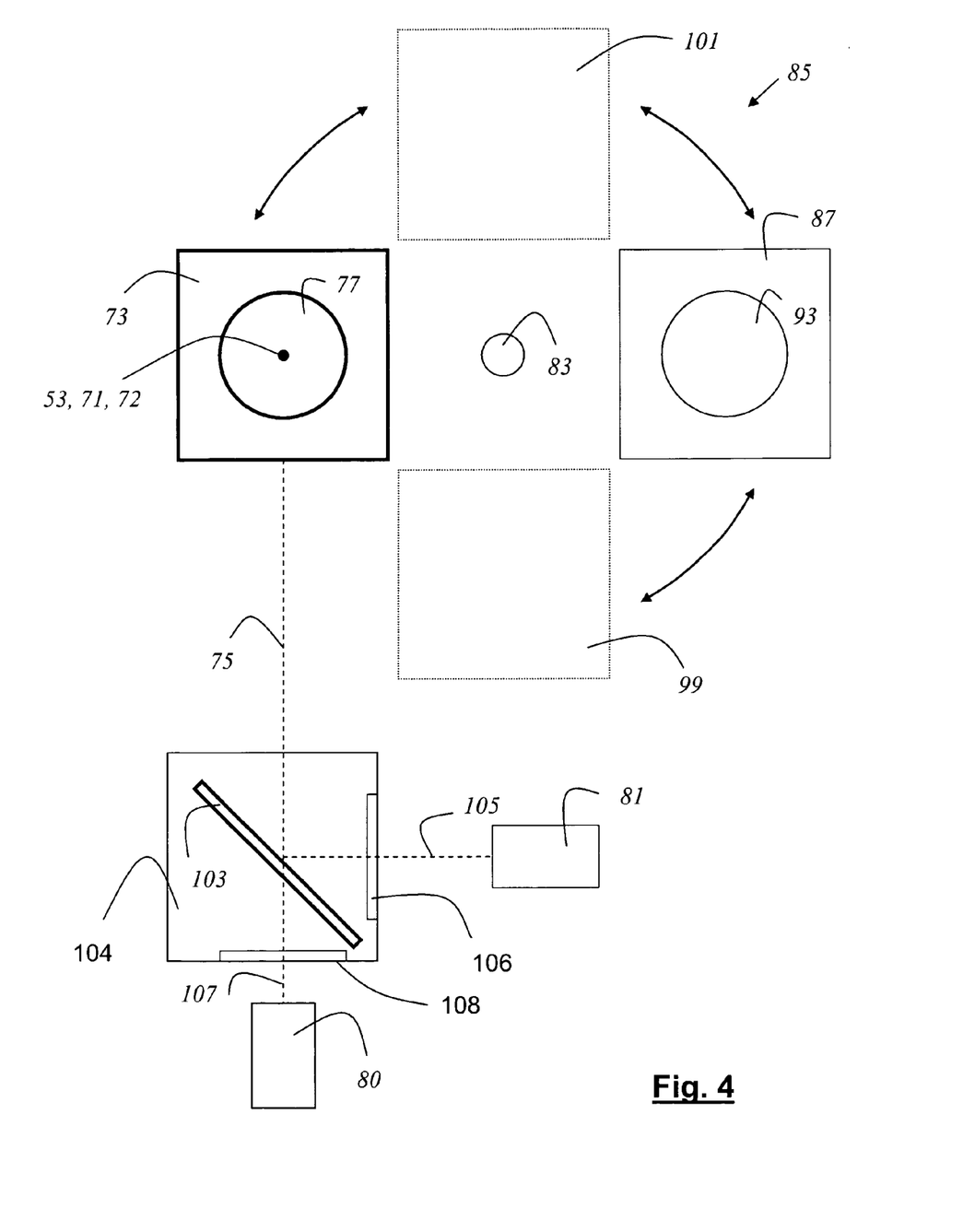
FIG. 4 is a plan view of the scanning microscope according to the present invention from FIG. 4.

FIG. 4 shows a plan view of the scanning microscope depicted in FIG. 3. Illuminating light 53 is incident onto the plane of the drawing. Detected light 75 emerges laterally from coupling-out element 73 and encounters filter block 104, which contains a dichroic beam splitter 103 and two blocking filters 106, 108. At dichroic beam splitter 103, which is embodied as a color beam splitter, detected light 75 is divided in accordance with the spectral distribution into beam segments 105 and 107 and conveyed to detectors 80 and 81, which are embodied as photomultipliers. The two blocking filters 106, 108 are configured so that only detected light of the respectively desired wavelength reaches detectors 80, 81. Open positions 99, 101 for descan detection are drawn with dotted lines.

Figure 5:
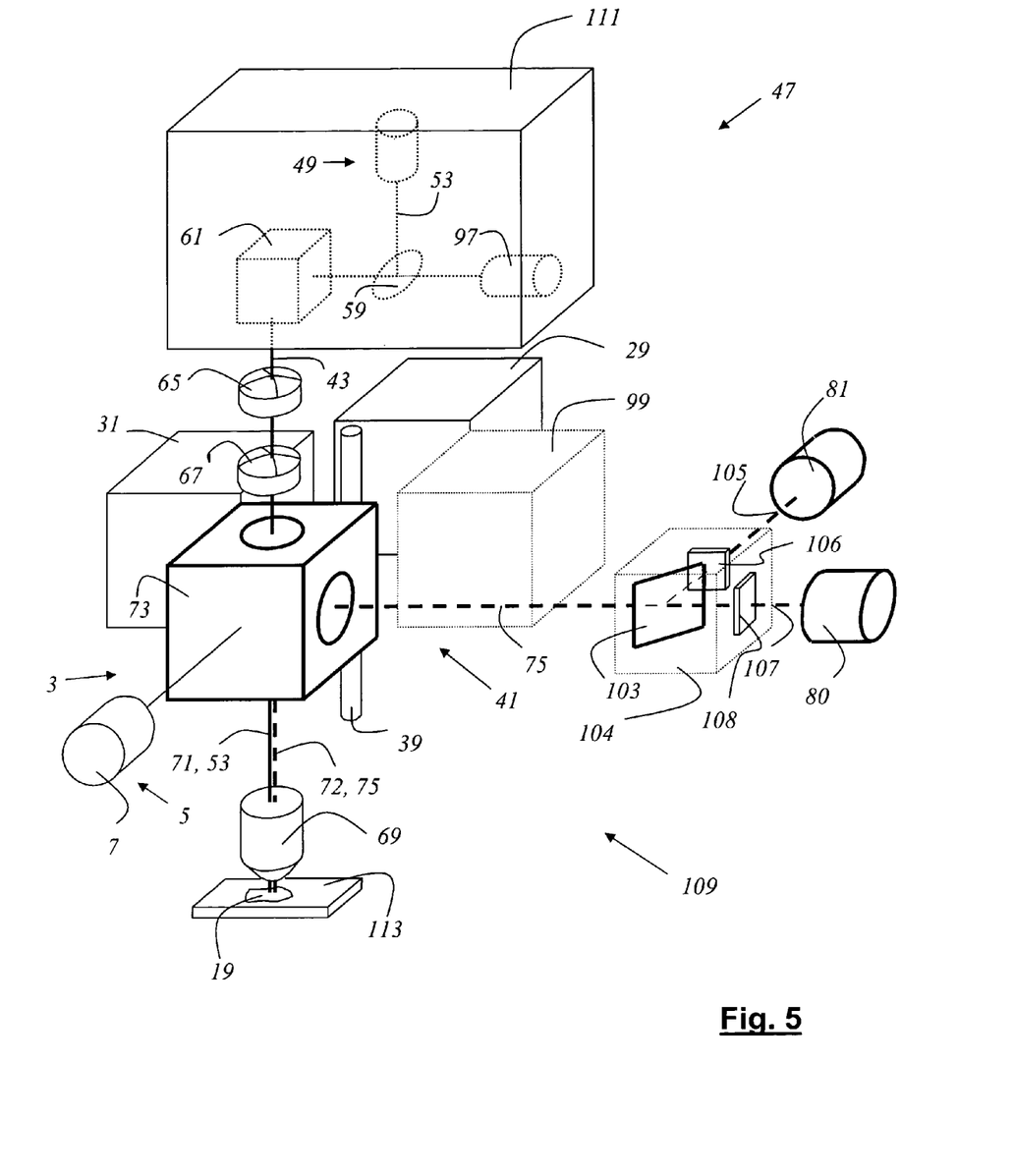
FIG. 5 shows a further scanning microscope according to the present invention.

FIG. 5 shows, in a perspective view, a confocal scanning microscope 47 that comprises a conventional light microscope 109 and a scanner module 111. Scanner module 111 contains a light source 49 for generating illuminating light 53, a beam deflection device 61, a first detector 97 for descan detection, and a beam splitter 59 that reflects illuminating light 53 to beam deflection device 61 and, in descan detection mode, allows the detected light to pass to first detector 97. Scanner module 111 furthermore contains elements (not shown) for beam guidance and shaping, as well as an excitation pinhole and a detection pinhole, which in the interest of clarity also are not shown. Specimen 19 rests, together with a specimen slide 113, on a microscope stage (not shown). Conventional light microscope 109 comprises a housing (not depicted) onto which scanner module 111 is flange-mounted. Conventional light microscope 109 furthermore contains a fluorescent incident-light illuminator 3 having a light source 5 that is embodied as an arc lamp 7, and a turret 41 that is rotatable about shaft 39. A coupling-out element 73 for scanning microscopy with non-descan detection, and a first and a second filter block 29, 31 for conventional fluorescent incident-light microscopy, are arranged in the turret. Turret 41 also comprises an open position 99 that can be rotated into illumination and detection beam path 71, 72. This position is used for scanning microscopy with descan detection. The housing of conventional light microscope 109 has a lateral opening through which, in non-descan detection mode, detected light 75 emerges and travels to further detectors 80 and 81 that are mounted on the housing.

Figure 6:
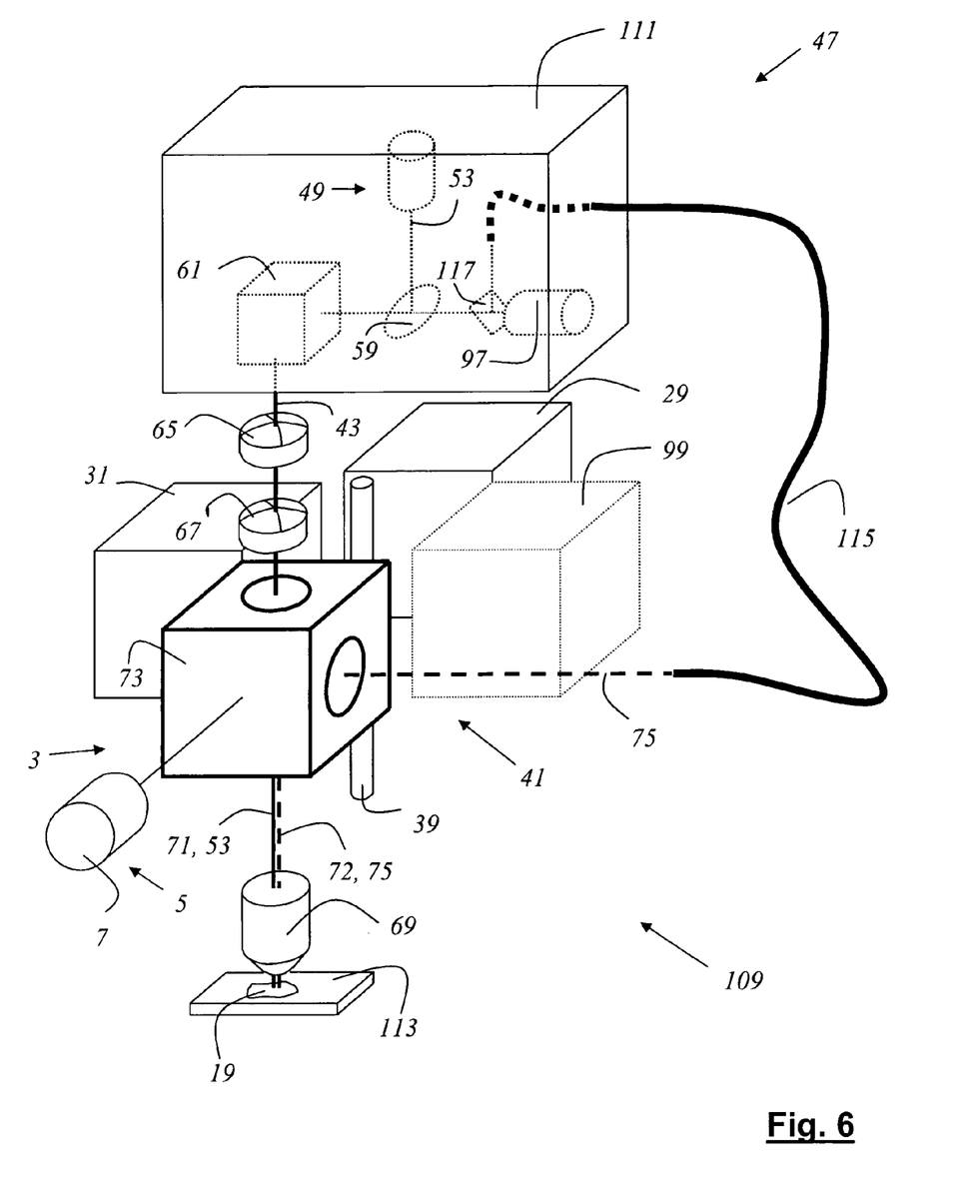
FIG. 6 shows a further scanning microscope according to the present invention.

FIG. 6 shows a scanning microscope 47 according to the present invention which is constructed for the most part exactly like scanning microscope 47 shown in FIG. 5. What is used for non-descan detection in this embodiment, however, is not further detectors 80, 81 but rather first detector 97 that is actually provided for descan detection. Detected light 75 is delivered to the latter via a light-guiding fiber 115 and a mirror 117, bypassing the detection pinhole.

Figure 7:
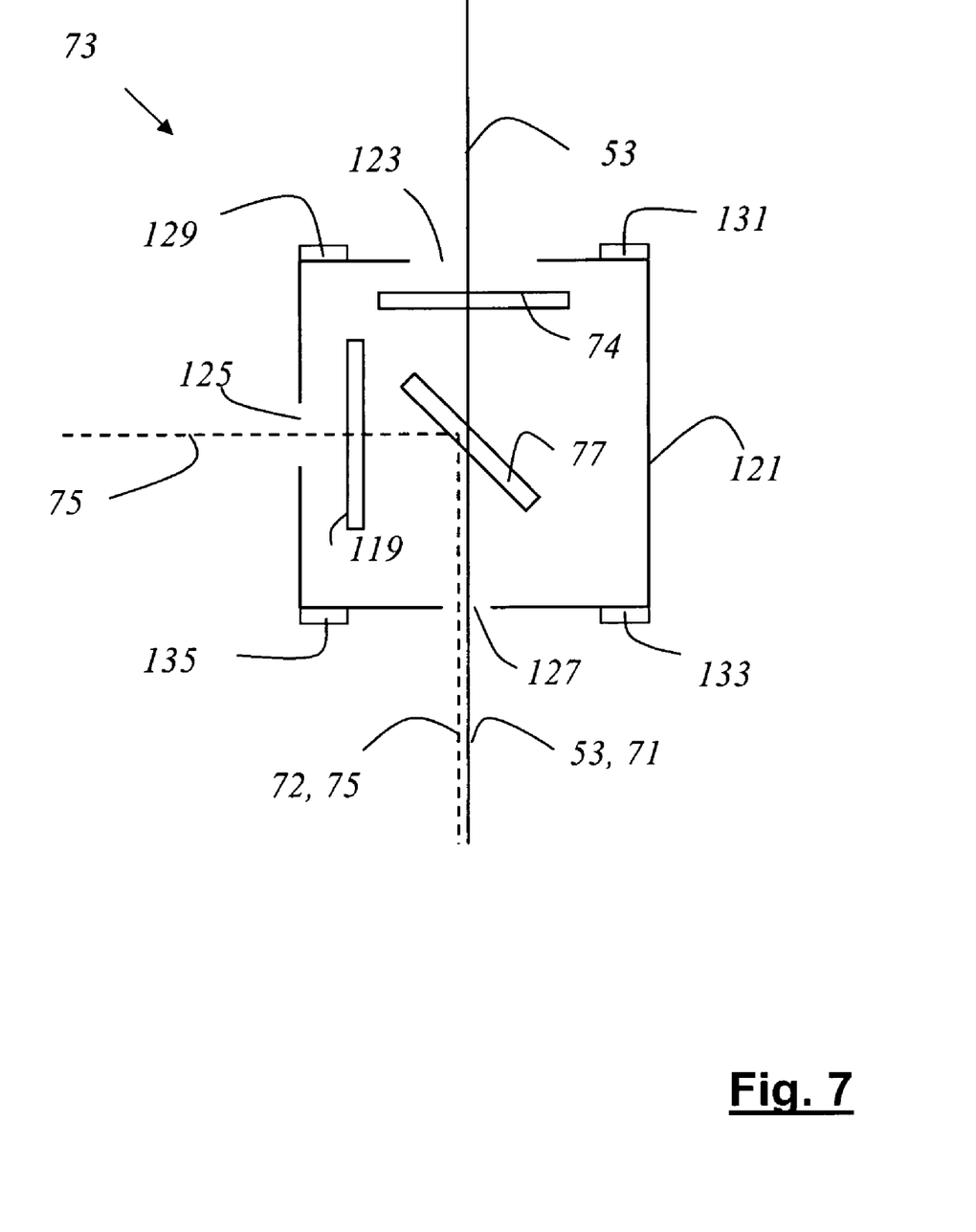
FIG. 7 shows a coupling-out element.

FIG. 7 shows a coupling-out element 73 according to the present invention that contains an excitation filter 7, a detection filter 119, and a dichroic beam splitter 77. Coupling-out element 73 comprises a housing 121 having three openings 123, 125, 127 through which illuminating light 53 and detected light 75 pass. Mounted on housing 121 are guidance and/or banking elements 129, 131, 133, 135 which make possible simple and reproducible positioning in excitation and detection beam path 71, 72.

Figure 8:
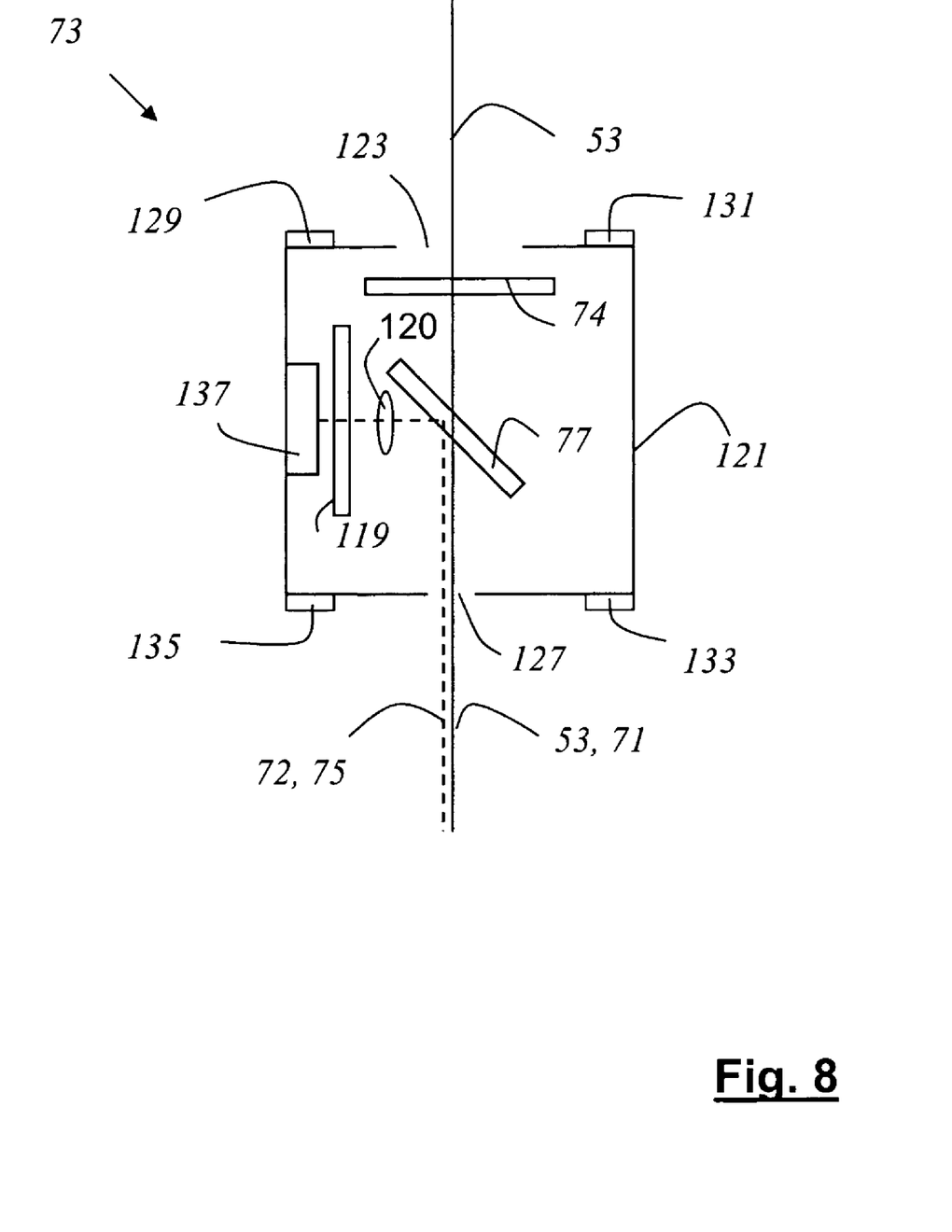
FIG. 8 shows a further coupling-out element.

FIG. 8 shows a coupling-out element 73 according to the present invention having an integrated further detector 137 that is configured as a photodiode. An optical system 120 is arranged in front of the detector.

The present invention has been described with reference to a particular embodiment. It is nevertheless self-evident that changes and modifications can be made without thereby leaving the range of protection of the following claims.

What is claimed is:

1. A scanning microscope comprising:
   a light source for emitting illuminating light for illumination of a specimen,
   at least one first detector for descan detection of detection light proceeding from the specimen,
   an objective arranged in both an illumination beam path and a detection beam path,
   a coupling-out element insertable into the illumination and detection beam path for non-descan detection, and removable from the illumination and detection beam path for descan detection, and
   a light-guiding fiber for transporting at least a portion of the detection light from the coupling-out element to the first detector.

2. The scanning microscope as defined in claim 1 further comprising: at least one guidance element for positioning the coupling-out element.

3. The scanning microscope as defined in claim 1 further comprising: at least one banking element for positioning the coupling-out element.

4. The scanning microscope as defined in claim 1, further comprising: a turret or a sliding carriage, on which the coupling-out element is mounted.

5. The scanning microscope as defined in claim 1, wherein the coupling-out element comprises a beam splitter.

6. The scanning microscope as defined in claim 1, wherein the coupling-out element comprises an excitation filter for blocking light of at least one wavelength out of the illuminating beam path.

7. The scanning microscope as defined in claim 1, wherein the coupling-out element comprises a detection filter for blocking light of at least one wavelength out of the detection beam path.

8. The scanning microscope as defined in claim 1 further comprising: a fluorescent incident-light illuminator in which the coupling-out element is positionable.

9. A coupling-out element for a scanning microscope, the scanning microscope including a light source for emitting illuminating light for illumination of a specimen and at least one first detector for descan detection of detection light proceeding from the specimen, the coupling element being insertable into an illumination and detection beam path of the scanning microscope for non-descan detection, and being removable from the illumination and detection beam path for descan detection, the coupling-out element comprising a light-guiding fiber for transporting at least a portion of detection light to the at least one first detector.

10. The coupling-out element as defined in claim 9, wherein the coupling-out element is positionable in a turret.

11. The coupling-out element as defined in claim 9, wherein the coupling-out element is positionable in a sliding carriage.

12. The coupling-out element as defined in claim 9, wherein the coupling-out element is positionable in a fluorescent incident-light illuminator.

13. The coupling-out element as defined in claim 9 further comprising guidance and/or banking elements for positioning of the coupling-out element.

14. The coupling-out element as defined in claim 9 further comprising: an excitation filter for blocking light of at least one wavelength out of the illumination beam path.

15. The coupling-out element as defined in claim 9 further comprising: a detection filter for blocking light of at least one wavelength out of the detection beam path.

16. The coupling-out element as defined in claim 9 further comprising: an optical system.

* * * * *

UNITED STATES PATENT AND TRADEMARK OFFICE
CERTIFICATE OF CORRECTION

PATENT NO.    : 6,977,773 B2
DATED         : December 20, 2005
INVENTOR(S)   : Johann Engelhardt, Werner Knebel and Heinrich Ulrich It is certified that error appears in the above-identified patent and that said Letters Patent is hereby corrected as shown below:

<u>Title page,</u>
Item [56], References Cited, U.S. PATENT DOCUMENTS,
  "5,169,289 A   12/1992 Lalanne ........ 250/458.1" should read
-- 6,169,289    01/2001 White et al. ... 250/458.1. --.

Signed and Sealed this

Second Day of May, 2006

JON W. DUDAS
*Director of the United States Patent and Trademark Office*